April 10, 1951  P. J. ERNISSE  2,548,525
FILM WINDING CONTROL FOR ROLL-FILM HANDLING APPARATUS
Filed Sept. 10, 1948
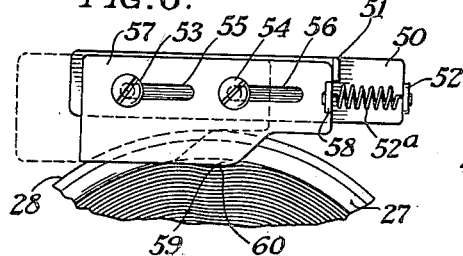
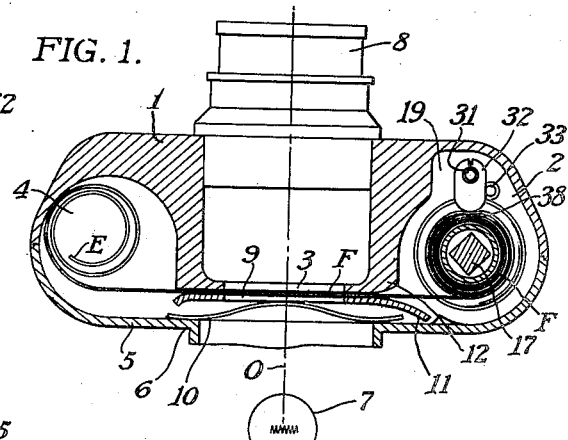
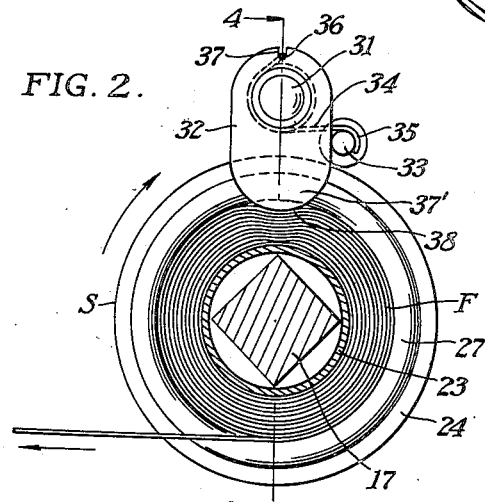
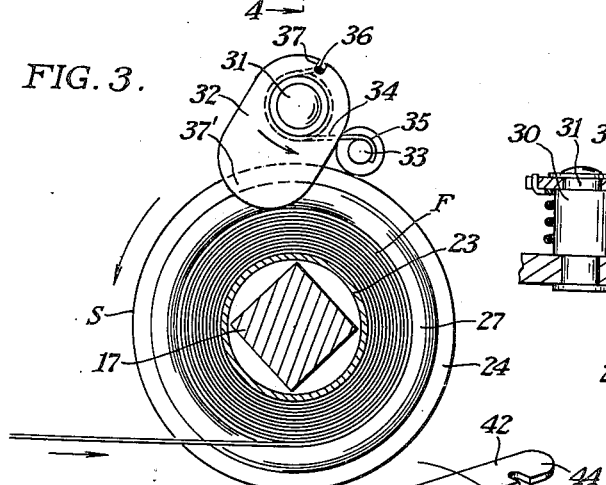
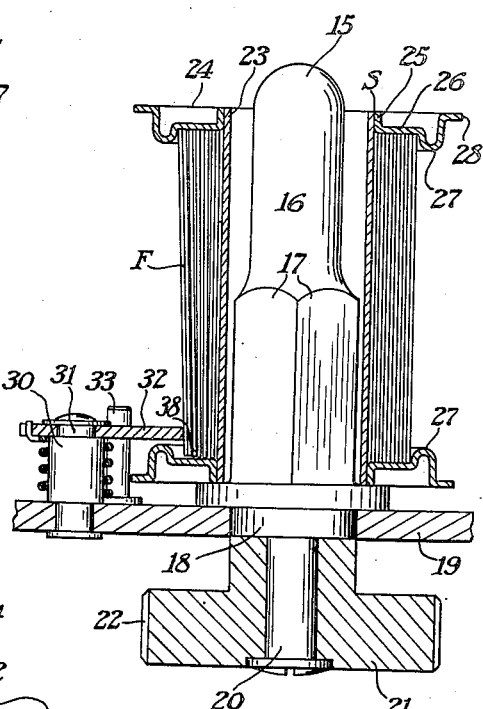
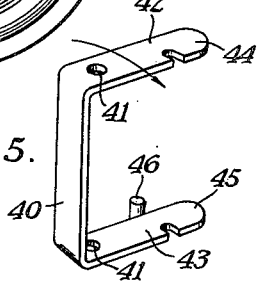
PAUL J. ERNISSE
INVENTOR.
BY Newton M. Perrins
Donald H. Stewart
ATTORNEYS Patented Apr. 10, 1951

2,548,525

UNITED STATES PATENT OFFICE 2,548,525

FILM WINDING CONTROL FOR ROLL-FILM HANDLING APPARATUS

Paul J. Ernisse, Rochester, N. Y., assignor to Eastman Kodak Company, Rochester, N. Y., a corporation of New Jersey Application September 10, 1948, Serial No. 48,615

8 Claims. (Cl. 242—71)

This application relates to photography and particularly to a film-winding control for roll-film handling apparatus. One object of my invention is to provide a film-winding control which is suitable for use in projectors and/or cameras or other apparatus in which a spool of film may be inserted in the apparatus and the film may be unwound past an exposure frame and wound back onto the original spool for removal from the apparatus. Another object of my invention is to provide a device of the class described in which means are provided for engaging and holding the film in the proper position for unwinding. Another object of my invention is to provide a film-engaging member which limits the frictional contact between the film and beads on the flanges of a film spool spaced closer together than the width of the film. A further object of my invention is to provide a film-presser member which is operative when the film is being moved in one direction and which is automatically released and is inoperative when the film is moved in an opposite direction. Other objects will appear from the following specification, the novel features being particularly pointed out in the claims at the end thereof.

Coming now to the drawings wherein like reference characters denote like parts throughout:

Fig. 1 is a fragmentary and somewhat schematic view of a projector, shown partially in section, with a winding control constructed in accordance with a preferred embodiment of my invention;

Fig. 2 is an enlarged sectional view through the winding control showing the control in its operative position in which film is unwound from the film spool;

Fig. 3 is a view similar to Fig. 2 but with the film control in its inoperative position as film is being wound upon the film spool;

Fig. 4 is a section taken on line 4—4 of Fig. 2 and showing the winding control in its operative position;

Fig. 5 shows a modified form of film-presser member in perspective, this presser member engaging opposite edges of the film, rather than one edge only, as shown in the preceding figures; and Fig. 6 shows a second embodiment of my invention, this figure being a top plan view of a slidable film presser, rather than a pivoted one shown in the preceding views.

In certain photographic apparatus, such as in projectors and cameras, as shown in the following patents: U. S. 2,360,255, Mihalyi, October 10, 1944; U. S. 2,364,381, Mihalyi, December 5, 1944, the loading and unloading of the apparatus is greatly simplified by providing a door, or opening, through which a single film spool is loaded into a chamber, from which it is propelled past an exposure frame and into a second chamber until the film is all unwound, and after which the film is returned to the original spool for removal from the apparatus. Such film spools are usually provided with flanges having facing beads closer together than the width of the film, so that the film must be bowed in cross section to pass between the beads. This bowing of the film stiffens it and the end may readily be directed between sections of a film gate or through a slot where the necessary operations occur, such as exposure of the film, or passing light through the film for projection.

It has been found with such apparatus that while the film can readily be wound back on the film spool by turning the film-spool support so that the film follows convolution-after convolution on the film spool hub, that it is nevertheless sometimes difficult to unwind film from the spool because it has been found that when the film support is turned, the film will be backed against the facing beads after a number of turns of the film spool and, when this occurs, if the direction of the film spool is reversed, the friction between the film and the beads is so great that the lost motion between the end of the film and the hub does not immediately pull the film from the beads and, consequently, the film will not pass beneath the beads and improper winding or actual damage to the film may then readily occur. This happens primarily where a short length of film is propelled from the spool and the direction is reversed, as may occur when pictures are being projected, for instance, and to a less extent where film is being exposed in a camera. My invention is directed to overcoming this difficulty in any kind of roll-holding apparatus using such a film system. I have provided a means for preventing frictional contact between at least a small area of the film and one of the beads on a film spool flange so that when the film is propelled from the film spool, at least a small area of film will be held away from the beads, thereby causing a loose coil of film on the spool, and, when the direction of the film spool movement is reversed, leaving plenty of room for the next successive convolutions to be wound on the spool and preventing improper winding.

In Fig. 1, I have shown, somewhat diagrammatically, a simple form of projector which is, of course, quite similar to a camera except that in this instance a light source is provided for passing light through a film. This projector may consist of a body portion 1 in which there is a supply spool chamber 2 to one side of an exposure frame 3, and on the opposite side there is a second spool chamber 4 into which a loose coil, or convolution, of film may be wound. In this instance, the back 5 of the projector is provided with a flange 6 on which a suitable lamphouse may be mounted to support a lamp 7 on the optical axis O of the projector; this axis passing through the exposure frame 3 and through an objective mounted in the lens barrel 8. The exposure frame 3 may carry a backing plate 9 for holding a film F flat on the exposure frame and this backing plate 9 may be pressed by parallel springs 10 into its operative position. Tapered walls 11 and 12 on the exposure frame and backing member are for directing the end E of the film F past the exposure frame. If desired, a channel, rather than a spring-pressed backing plate, may be used, both these constructions being known for apparatus of this type. The supply chamber 2 is preferably provided with a film-spool support, here shown in the form of a post 15, having a cylindrical top 16 extending upwardly from a polygonal bottom 17, here shown as a squared shaft.

This shaft has a bearing 18 passing through the projector wall 19 and a shaft 20 of reduced area on which a winding knob 21, preferably knurled at 22, is placed. Thus, by turning the winding knob 21 forwardly or rearwardly, film F from a film spool S may be moved to-or-from the film-spool core 23. The film-spool flanges 24 may be formed out of sheet metal or plastic, and these flanges are attached to the core at 25. They extend outwardly at 26 and have downwardly extending beads 27 near the periphery 28 of the flanges. These beads extend towards each other and are closer together than the convolutions of film F wound on the hub 23 and, consequently, the film F is confined and cannot, of itself, spring out away from the film-spool core. Thus, no means is necessary to hold the convolutions in a closed position and if the film is backed, in the case of negative film, no leader strip, or backing paper, is required. As thus far described, the construction is known, as is indicated by the patents above mentioned.

My control consists in providing a means for holding an area of film away from a bead 27, particularly during the film unwinding operation. Since it is not necessary during the winding operation, in which film is wound back upon the film spool, I prefer to have the film control member operate only when the film is moved in an unwinding direction.

In Figures 1 to 4, I have illustrated a preferred embodiment of my invention. As shown in these figures, a projector wall, such as 19, may be provided with an upstanding stud 30 having a shoulder 31 on which a presser member 32 is hingedly mounted. This presser member is normally pressed against a stop pin 33 by means of a coiled spring 34. One end of the spring 35 engages the pin and the other end 36 engages a notch 37 in the presser member. This presser member or lever may be provided with a rounded end 37' to engage convolutions of film F at 38 to hold at least an area of film away from frictional contact with a bead 27 of a film-spool flange 24. When in the operative position shown in Fig. 2, the presser member somewhat resembles a toggle in that the rounded portion 37' engages and presses the film from the bead 27 when the toggle lies more or less on a straight line between the center of the stud 31 and the winding post 15. As above pointed out, the spring 34 normally holds the toggle in this position, and when the handle 21 is turned to turn the spool, designated broadly as S, in the direction shown by the arrow in Fig. 2, the film is propelled in the direction shown by the arrow, away from the film spool. During this movement while some of the film engages the beads 27, in fact most of it engages the bead 27 in this view, but nevertheless when winding stops, the film will not be pressed tightly against the bead 27 around its entire periphery and, therefore, when the direction of the handle 21 is reversed, the presser member 32 rocks on its pivot and against spring pressure into the Fig. 3 position. This allows the convolutions of film to open up somewhat so that continued turning of the shaft 15 causes the inner end of the film to snugly fit the core 23, and the loose convolutions of film permit the film to move smoothly toward the core, the film of course being bowed in passing between the two beads. Thus, there is no tendency for the film convolutions to pile up over film convolutions already pressed tightly against the beads 27, as would otherwise occur without the film winding control member.

I have found that this control member may take many forms and Figs. 5 and 6 illustrate additional forms. In the preceding views, the presser member has engaged only one edge of a film adjacent one film spool flange bead 27. This works entirely satisfactory. If, however, it is desired to press both edges instead of only one, the Fig. 5 presser member may be substituted for the presser member 32; the stud 31 being extended upwardly approximately the height of the film spool. In Fig. 5 the presser member 40 is provided with apertures 41 to form bearings on a supporting stud and there are two arms, 42 and 43, with film-engaging rounded ends 44 and 45. This member, U-shaped from a side view, may be pressed against a locating pin 46, similar to pin 33, by a spring, not shown, similar to spring 34. It differs from the first-described embodiment solely in pressing two areas of the film, one at the top and one at the bottom of the film spool, away from the bead 27.

Fig. 6 shows another form of my invention. In this form, there is a block 50 having an upturned ear 51 and a second upturned ear 52. This block is provided with a pair of upstanding pins 53 and 54 which pass through slots 55 and 56 in a slide plate 57. Plate 57 has an upturned ear 58 and a spring 52a connects this ear to ear 52. Plate 57 has a rounded projection 59 which is adapted to slide across the film spool bead 27 and into contact with certain convolutions to hold certain convolutions of film 60 away from the bead 27. Consequently, this slide member accomplishes just what is accomplished by the preceding embodiments.

It should be noticed from all the embodiments that when the film spool is turned in a direction to unwind film, the film control presser member merely holds certain areas of the film away from the film spool flange beads. This area need not be large and in fact I have found that entirely satisfactory performance can be had with only slight pressure against a small area of the film. By providing a light spring tending to move the film presser into operative position, its mere friction with the film will assist the spring and hold the presser in its operative position as film is unwound. When reverse movement of the film takes place, the friction with the film readily overcomes the light spring pressure and the presser member may swing to the inoperative position shown in Fig. 3, wherein it no longer holds the film away from the bead. Even the slight pressure on a film area leaves sufficient lost motion between the outer convolution of film and the bead for the film to be thereafter wound properly on the spool, because the first few turns of the handle 21 draw the loose convolutions down against the film spool core.

While I have illustrated and described several preferred embodiments of my invention, it is obvious that various other forms can readily be constructed. I therefore do not limit myself to the forms shown and described herein, but only to such forms as may come within the terms of the appended claims.

What I claim is:

1. A film-winding control for roll-film handling apparatus including a supply chamber, a support for a film spool therein adapted to receive film wound on a spool having a core and flanges thereon with beads projecting towards each other and closer together than the width of a film, means for moving the support, an exposure frame adjacent the supply chamber and a take-up chamber on the opposite side of the exposure frame from the supply chamber, said winding control comprising a movable film presser mounted adjacent the film spool support and spring pressed to move across a flange and a bead of the spool and into a position in which the film presser may lie closer to the film spool core than does the bead on the film spool flange to normally hold an area of film out of contact with said bead when the film is wound in an unwinding direction.

2. The film-winding control defined in claim 1 characterized by the spring pressing the film presser in one direction being overcome by turning the film spool in a direction to wind film on the spool.

3. The film-winding control defined in claim 1 characterized by a means lying in the path of movement of the film presser for limiting movement of the film presser to an operative position in which the film presser lies across the bead and projects toward the film spool core inwardly of the bead on the film spool flange.

4. The film-winding control defined in claim 1 characterized by the frictional contact between the film presser and the film moving the presser against the pressure of its spring and into an inoperative position with respect to the bead on the film spool flange.

5. The film-winding control defined in claim 1 characterized by the film presser comprising a hinged member carried by a pivot spaced from the support for the roll film.

6. The film-winding control defined in claim 1 characterized by the film presser comprising a hinged member carried by a pivot spaced from the support for the roll film and having an operative position when positioned substantially on a line between the pivot and the film spool support, and having an inoperative position to one side of said line, said presser spring tending to turn the presser toward its operative position.

7. The film-winding control defined in claim 1 characterized by the film presser member engaging spaced lateral edges of the film adjacent the film spool beads on the film spool flanges.

8. The film-winding control defined in claim 1 characterized by the film presser member comprising a slide movable over a film spool flange bead to engage the film tangentially of the film spool flange bead to press limited areas of the film from the bead.

PAUL J. ERNISSE.

REFERENCES CITED

The following references are of record in the file of this patent:

UNITED STATES PATENTS

| Number | Name | Date |
| --- | --- | --- |
| 1,252,385 | Bengough et al. | Jan. 8, 1918 |
| 2,324,086 | Hutchison | July 13, 1943 |
| 2,364,381 | Mihalyi | Dec. 5, 1944 |